United States Patent [19]

Kakizaki

[11] 3,855,175
[45] Dec. 17, 1974

[54] PROCESS FOR PREPARING NOVEL GLASS FIBER REINFORCED THERMOPLASTIC COMPOSITION

[76] Inventor: Tetsuji Kakizaki, c/o Jushikenkyujo Mitsubishi Petrochemical Co., Ltd., Yokkaichi, Japan

[22] Filed: Oct. 24, 1973

[21] Appl. No.: 409,065

Related U.S. Application Data

[63] Continuation-in-part of Ser. No. 338,535, March 6, 1973, abandoned, which is a continuation-in-part of Ser. No. 175,355, Aug. 26, 1971, abandoned.

[30] Foreign Application Priority Data

Sept. 1, 1970 Japan.............................. 45-76488
Sept. 3, 1971 Great Britain.................... 40776/71

[52] U.S. Cl. ........................... 260/42.15, 260/42.45
[51] Int. Cl. ............................................. C08f 45/10
[58] Field of Search.......... 260/41 AG, 42.15, 42.45

[56] References Cited
UNITED STATES PATENTS

| | | | |
|---|---|---|---|
| 3,271,355 | 9/1966 | Vanderbilt et al................. | 260/41.5 |
| 3,472,729 | 10/1969 | Sterman et al................. | 260/41 AG |
| 3,702,356 | 11/1972 | Hall............................... | 260/41 AG |

OTHER PUBLICATIONS

Modern Plastics Encyclopedia 1967, Sept. 1966, Vol. 44, No. 1A, pages 416, 417 & 457, TP986.AZ MSC3.

Primary Examiner—Allan Lieberman
Assistant Examiner—J. H. Derrington
Attorney, Agent, or Firm—Oblon, Fisher, Spivak, McClelland & Maier

[57] ABSTRACT

Glass fiber reinforced thermoplastic compositions are formed by treating 5 – 60 percent by weight of glass fibers with 0.01 – 1.0 percent by weight based on the weight of said fibers, of an organosilane selected from the group consisting of epoxy silanes and amino silanes, admixing said treated fibers with 95 to 40 weight percent of polypropylene, and 0.1 to 5.0 percent by weight of an organosilane coupling agent selected from the group consisting of vinyl silanes, methacryl silanes, epoxy silanes, amine silanes and mixtures thereof, and melt-shaping the resulting mixture.

9 Claims, No Drawings

PROCESS FOR PREPARING NOVEL GLASS FIBER REINFORCED THERMOPLASTIC COMPOSITION

RELATIONSHIP TO RELATED APPLICATIONS

This application of a Continuation-In-Part of copending application Ser. No. 338,535, filed Mar. 6, 1973 now abandoned, which in turn is a Continuation-In-Part of copending application Ser. No. 175,355 filed Aug. 26, 1971 now abandoned.

BACKGROUND OF THE INVENTION

1. Field of Invention

This invention relates to a process for preparing novel glass fiber reinforced thermoplastic compositions.

2. Description of Prior Art

Various studies have been made of different types of thermoplastic materials as reinforcing resins for glass fiber. Polypropylene has been studied with particular interest because of its relative low cost and good properties, which make it particularly well adapted for use as a so-called "engineering resin." The combination of polypropylene and glass fibers can find particularly good application in the field of automobile construction and in the field of electrical instrumentation because of its high heat resistance and low thermal deterioration, as shown by an especially long even-life. Moreover, the oven-life of polypropylene can be still further extended by the incorporation of a stabilizer, to as high as 600-700 hours at 150°C. for a pressed sheet 0.5 mm. in thickness.

The affinity of polypropylene for glass fibers, however, is quite poor and ways have been sought to overcome this difficulty. For instance, it has been contemplated to add a peroxide compound to polypropylene. While the peroxide does improve affinity, it has been found to cause an acceleration of deterioration of the polypropylene and to adversely affect the properties of the finished product. In fact, the use of a peroxide has been found to cause a deterioration of oven-life to less than 300 hours at 150°C. for an 0.5 mm. thick pressed sheet, as compared with an oven-life of 600–700 hours for the same compositions without the peroxide. Although the use of certain stabilizers will improve this result, conventional stabilizers will cause the introduction of bad color tones to the product.

It has also been contemplated to use a surface modifier on the surfaces of the glass fiber, but completely satisfactory results have not been obtainable by this method.

A need exists, therefore, for a technique of improving the affinity of the polypropylene for the glass fibers without adversely affecting the properties of the final product.

SUMMARY OF THE INVENTION

Accordingly, it is an object of this invention to provide a process for preparing a novel glass fiber reinforced polypropylene composition having good mechanical characteristics, good heat resistance and good color tone.

This and other objects of this invention can be attained by treating 5 – 60 percent by weight of glass fibers with 0.01 – 1.0 percent by weight based on the weight of said fibers, of an organosilane selected from the group consisting of epoxy silanes and amino silanes, admixing said treated fibers with 95 to 40 weight percent of polypropylene, and 0.1 to 5.0 percent by weight of an organosilane coupling agent selected from the group consisting of vinyl silanes, methacryl silanes, epoxy silanes, amine silanes and mixtures thereof, and melt-shaping the resulting mixture.

DETAILED DESCRIPTION OF THE PREFERRED EMBODIMENTS

The polypropylene used in this invention is preferably a polypropylene powder having a melt index of 4 – 25. Any conventional peroxide compound which is conventionally used for improving the affinity of polypropylene for glass fibers can be used. Good results are obtainable with benzoyl-peroxide. The peroxide may be present in amounts of 0.01 – 0.5 percent by weight, and preferably 0.04 – 0.2 percent by weight. Especially good results are obtainable with about 0.1 percent by weight to the polypropylene.

The silane coupling agent used in this invention can be an organosilane, such as trimethoxysilanes, preferably γ-methacryloxypropyltrimethoxysilane.

Good results are obtainable when the silane coupling component is a vinyl type ($CH_2$=CHSi-), methacryl type

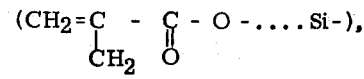

epoxy type 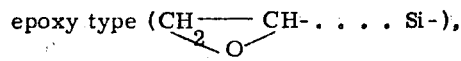

or amine type ($NH_2$. . . Si—).

Best results have been obtained with such methacryl type organosilanes as γ-methacryloxypropyltrimethoxysilane.

Suitable organosilanes which may be applied to the glass fibers include the epoxy type organosilanes, such as

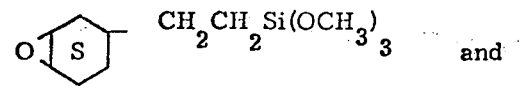 and

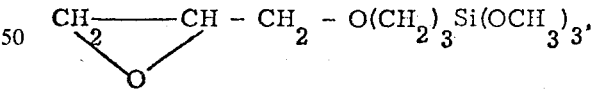

and the amino type organosilanes, such as
γ-aminopropyltriethoxysilane;
N-β-(aminoethyl)-γ-aminopropyltrimethoxysilane;
bis-(β-hydroxyethyl)-γ-aminopropyltriethoxysilane; or
n-(dimethoxymethylsilylpropyl)-ethenediamine.

The first two-mentioned amino type organosilanes are especially useful for glass fibers.

Quite acceptable results are also obtainable with any of the following organosilanes for application to the glass fibers:

In preparing the composition of this invention, the organosilane is admixed with the polypropylene. The organosilane may be used in amounts of 0.1 – 5.0 per-

| | |
|---|---|
| Vinyltriethoxysilane | $CH_2=CHSi(OC_2H_5)_3$ |
| Vinyltrichlorosilane | $CH_2=CHSiCl_3$ |
| Vinyl-tris(β-methoxy-ethoxy)silane | $CH_2=CHSi(OCH_2CH_2OCH_3)_3$ |
| γ-Methacryloxypropyltrimethoxysilane | $CH_2=C(CH_3)-C(O)-O(CH_2)_3Si(OCH_3)_3$ |
| β-(3,4-epoxycyclohexyl)-ethyltrimethoxysilane | (epoxycyclohexyl)$CH_2CH_2Si(OCH_3)_3$ |
| γ-Glycidyloxypropyl-trimethoxysilane | $CH_2\text{-}CH\text{-}CH_2\text{-}O(CH_2)_3Si(OCH_3)_3$ (epoxide) |
| γ-Aminopropyltriethoxysilane | $NH_2CH_2CH_2CH_2Si(OC_2H_5)_3$ |
| N-β-(Aminoethyl)-γ-Aminopropyltrimethoxysilane | $NH_2CH_2CH_2N(H)(CH_2)_3Si(OCH_3)_3$ |
| bis(β-Hydroxyethyl)-γ-aminopropyltriethoxysilane | $(HOCH_2CH_2)N(CH_2)Si(OC_2H_5)_3$ |
| γ-Chloropropylmethoxysilane | $ClCH_2CH_2CH_2Si(OCH_3)_3$ |
| γ-Mercaptopropyltrimethoxysilane | $HSCH_2CH_2CH_2Si(OCH_3)_3$ |
| n-(Dimethoxymethyl Silylpropyl) ethylene diamine | $H_2N(CH_2)_2NH(CH_2)_3Si(OCH_3)_2CH_3$ |
| γ-chloro isobutyltriethoxysilane | $ClCH_2CH(CH_3)CH_2Si(OC_2H_5)_3$ |
| β-Cyclohexylethyltrimethoxysilane | (cyclohexyl)$CH_2CH_2Si(OCH_3)_3$ |
| Phenyltriethoxysilane | (phenyl)$Si(OC_2H_5)_3$ |
| Amyltrimethoxysilane | $C_5H_{11}Si(OCH_3)_3$ |
| Vinyltrimethoxysilane | $CH_2=CHSi(OCH_3)_3$ | cent by weight of the composition, and preferably in amounts of 0.1 – 0.3 percent by weight. Optimum results are obtained with about 0.15 percent.

The polypropylene is used in amounts of 95 to 40 percent by weight of the total composition.

The glass fibers are used in an amount of 5 to 60 percent by weight and preferably 5 – 40 percent by weight based on the weight of the total composition. The shape of the glass fibers can be a chopped strand of 5 – 13$\mu$ in diameter and up to 10 mm in length, or it can be in the form of a ribbon or 5 to 13$\mu$ diameter.

The glass fibers are treated with 0.01 to 1.0 percent of an organosilane, such as epoxy silanes or amino silanes, based on the weight of the glass fibers. Preferred amounts of organosilane for fiber treatment is from 0.02 to 1.0 percent. This thus corresponds to an amount of from 0.002 to 0.20 percent by weight of organosilane which is used for treatment of the glass fibers, based on the weight of the total composition.

The glass fiber reinforced thermoplastic compositions of this invention can be prepared by any of the following processes:

1. An organosilane,, e.g., epoxysilane, is applied to a strand type or ribbon type of glass fiber and a mixture of melted polypropylene, benzoylperoxide and an organosilane, e.g., $\gamma$-methacryloxypropyltrimethoxysilane, is coated onto the fibers. The mixture is then pelletized into a suitable size.

2. An organosilane, e.g., an epoxysilane, is applied to a chopped strand of glass fiber and a mixture of polypropylene, benzoylperoxide and an organosilane, e.g., $\gamma$-methacryloxypropyltrimethoxysilane is blended therewith by using a tumbler type, or V-shape-type blender. The mixture is melt-extruded and pelletized.

3. The chopped strand of glass fiber, treated according to the method (2), is blended with a mixture of polypropylene, benzoylperoxide and $\gamma$-methacryloxypropyltrimethoxysilane, and is supplied to a hopper for extruding or to a molding apparatus by dry blending. It is possible to add various additives, such as coloring materials, e.g., pigment, fillers or modifiers.

In accordance with this invention, it is possible to use other types of thermoplastic resins such as polyethylene, etc., instead of polypropylene.

One of the aspects which makes this invention interesting is that although ordinarily the addition of a peroxide compound to a glass fiber reinforced polypropylene will result in a deterioration of the mechanical properties of the polypropylene, the use of the organosilane has an offsetting effect whereby the peroxide is reacted with the organosilane, so that not only is affinity of the polypropylene for the glass fibers improved, but excellent tensile strength and flexural strength is obtained.

Moreover, the presence of small amounts of peroxide within the context of this invention actually improves heat endurance and provides substantially similar color tones as is obtained with untreated polypropylene-fiber glass mixtures.

These improved mechanical properties are particularly recognizable when benzoylperoxide is used with a trimethoxysilane, such as $\gamma$-methacryloxypropyltrimethoxysilane.

The manner of the organosilane-peroxide reaction is not completely understood. However, it is believed that the peroxide does not itself promote cross-linking of the polypropylene, but rather the peroxide promotes the reaction of the organosilane with the polypropylene.

Having now generally described the invention, a further understanding can be obtained by reference to certain comparative examples which are presented herein for purposes of illustration only and are not intended to be limiting unless otherwise so specified.

(EXPERIMENT I)

Water-methanol (1:1) solutions of the silane coupling agent, together with the peroxide and the stabilizer are shown in Tables I, II and III, which were added to polypropylene (melt index 10). The mixture was bblended by using a super mixer.

The specific amount of chopped strands of glass fibers of 6 mm. of average length were treated with an aminosilane which was added to said blended composition and mixed in a tumbler. The mixture was pelletized at a pelletizing temperature of 220° C. at 70 rpm. of screw rotary velocity by 40 mm$\phi$ vented extruder.

The resulting pellets were injection molded at a temperature of 240° C. and a screw rotary velocity of 60 rpm., so as to prepare each sample. The mechanical properties of each sample were measured in accordance with ASTM D638, D790. The results are shown in Tables I, II, and III.

In these Tables the quantity of propylene is approximate and is reduced by the quantity of peroxide and silanes present. In other words if the polypropylene is indicated as 70 percent, but there is 0.7 percent peroxide and 0.01 percent coupling agent, the actual amount of polypropylene would be about 62.29 percent.

In these examples the following procedure was used to treat the glass fibers. The glass fibers having 9 of diameter were chopped into 6 mm lengths and were dipped in 1 percent aqueous solution of said epoxysilane or aminosilane in hot condition of melt spinning.

TABLE I

Mechanical Properties of Compositions of Various Amounts of Glass Fiber Blended with Polypropylene

| No. | Aminosilane treated glass fibers | Polypropylene (approximate %) | Silane Coupling Agent | Tensile Strength | Flexural Strength | Oven-life | Color Tone |
|---|---|---|---|---|---|---|---|
| 1 | - | - | - | 340 | 370 | 1000< | ◎ |
| 2 | 10% | 90 | - | 460 | 665 | | ◎ |
| 3 | 20% | 80 | - | 480 | 689 | | ◎ |
| 4 | 30% | 70 | - | 482 | 698 | | ◎ | gear oven is used   sample pressed sheets, 0.5 mm. thickness.

Aminosilane used is $NH_2CH_2CH_2N(CH_2)_3Si(OCH_3)_3$, 0.05% weight based on weight of glass fiber

TABLE II

Mechanical Properties in Various Concentration of Silane Coupling Component

| No. | Aminosilane treated glass fiber | Polypropylene | Peroxide | Silane coupling agent | Tensile strength | Flexural strength | Oven-life | Color tone |
|---|---|---|---|---|---|---|---|---|
| 5 | 30% | 70% | Dicup 0.7% | – | 510 | 680 | | ○ |
| 6 | 30% | 70% | 0.7% | 0.01% | 510 | 681 | | ○ |
| 7 | 30% | 70% | 0.7% | 0.05% | 527 | 691 | 300> | ○ |
| 8 | 30% | 70% | 0.7% | 0.1% | 600 | 832 | | ○ |
| 9 | 30% | 70% | 0.7% | 0.2% | 641 | 853 | | ○ |
| 10 | 20% | 80% | 0.7% | 0.2% | 615 | 824 | | ○ |

Silane coupling component: γ-methacryloxypropyltrimethoxysilane

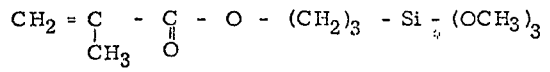

Aminosilane used is $NH_2CH_2CH_2N(CH_2)_3Si(OCH_3)_3$, 0.05% weight based on weight of glass fiber

TABLE III

Mechanical Properties in Various Types and Concentrations of Peroxides

| No. | Aminosilane treated glass fiber | Polypropylene (approximate %) | Peroxide | | Silane coupling agent | Tensile strength | Flexural strength | Oven-life | Color tone |
|---|---|---|---|---|---|---|---|---|---|
| 11 | 30% | 70% | Dicup. | 0.05% | 0.15% | 447 | 646 | | ○ |
| 12 | 30% | 70% | | 0.1% | 0.15% | 630 | 874 | 300> | ○ |
| 13 | 30% | 70% | | 0.5% | 0.15% | 596 | 823 | | × |
| 14 | 20% | 80% | | 0.1% | 0.15% | 592 | 818 | | ○ |
| 15 | 30% | 70% | BPO | 0.05% | 0.15% | 561 | 779 | | ○ |
| 16 | 30% | 70% | | 0.1% | 0.15% | 593 | 878 | 300> | ○ |
| 17 | 30% | 70% | | 0.5% | 0.15% | 582 | 837 | | × |
| 18 | 30% | 70% | | 0.1% | 0.15% | 579 | 811 | | ○ |
| 19 | 30% | 70% | BPO | 0.05% | 0.15% | 542 | 672 | | ○ |
| 20 | 30% | 70% | | 0.1% | 0.15% | 575 | 768 | 300> | ○ |
| 21 | 30% | 70% | | 0.5% | 0.15% | 740 | 880 | | × |
| 22 | 20% | 80% | | 0.5% | 0.15% | 618 | 798 | | ○ |
| 23 | 10% | 90% | | 0.5% | 0.15% | 520 | 611 | | ○ |

TABLE III - Continued

Silane coupling component: γ-methacryloxypropyltrimethoxysilane

Peroxide:

Dicup: di-cumylperoxide     BPO: benzoylperoxide

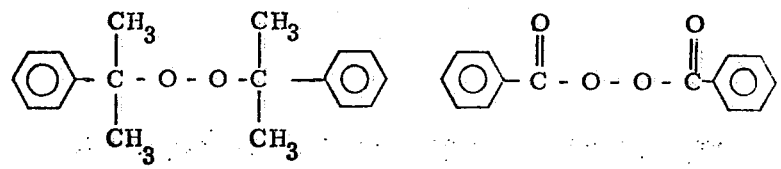

Aminosilane: NH$_2$CH$_2$CH$_2$N(CH$_2$)$_3$Si(OCH$_3$)$_3$ , 0.05% weight based on p-40 : γ,γ'-bis(t-butylperoxy)p-di-isopropylbenzene

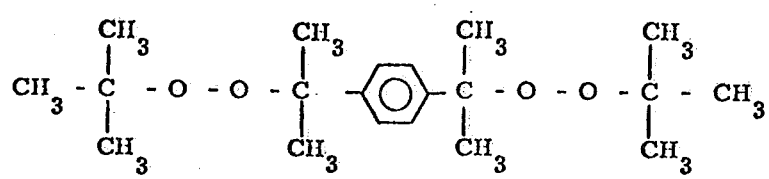

When the combination of peroxide and organosilane were not used, as shown in Table I, it was found that both tensile strength and flexural strength were remarkably low.

As shown in Tables II and III, when glass fibers treated with an aminosilane was used, the amount of peroxide for providing the highest strength was 0.5 percent by weight on benzoylperoxide, or 0.1 percent by weight of dicumylperoxide or 0.1 percent by weight of γ,γ'-bis(t-butylperoxy)p-di-isopropylbenzene.

Since large amounts of peroxide are required, the oven-life of the composition was about 300 hours. Where the amount of stabilizer was increased for improving heat resistance, a dark reddish-brown color appeared and the strength of the composition was found to deteriorate.

Where the amount of γ-methacryloxypropyltrimethoxysilane coupling agent was increased, the tensile strength and flexural strength of the composition were increased. However, the oven-life of the composition was not improved.

(EXPERIMENT II)

Each sample was prepared in accordance with the process of Experiment I, except using an epoxysilane instead of the aminosilane.

The mechanical properties of each sample were measured. Each amount of the peroxide, the silane coupling agent and the glass fiber treated with epoxysilane, and the results of the tests are shown in Tables IV, V, and VI.

TABLE IV

Mechanical Properties in Various Amounts of Glass Fiber Blended to Untreated Polypropylene Base

| No. | Epoxysilane treated glass fiber | Polypropylene (approximate %) | Peroxide | Silane Coupling agent | Tensile strength | Flexural strength | Oven-life | Color tone |
|---|---|---|---|---|---|---|---|---|
| 1  |     |     | - | - | 340 | 370 |       | ◎ |
| 24 | 10% | 90% | - | - | 460 | 603 | 1,000 | ◎ |
| 25 | 20% | 80% | - | - | 520 | 700 |       | ◎ |
| 26 | 30% | 70% | - | - | 526 | 713 |       | ◎ |

Epoxysilane: CH$_2$—CH-CH$_2$-O(CH$_2$)$_3$Si(OCH$_3$)$_3$ , 0.05% weight based on weight of glass fiber

TABLE V

Mechanical Properties in Various Types of Silane Coupling Agents

| No. | Epoxysilane treated glass fiber KBM 403 | Polypropylene (approximate %) | Peroxide | Silane coupling agent | Tensile strength | Flexural strength | Oven-life | Color tone |
|---|---|---|---|---|---|---|---|---|
| 27 | 20% | 80% | BPO 0.1% | — | 610 | 730 | >1,000 | ◎ |
| 28 | 20% | 80% | 0.1% | KBM 403 0.15% | 591 | 705 | >1,000 | × |
| 29 | 20% | 80% | 0.1% | KBM 503 0.15% | 690 | 810 | >1,000 | ◎ |
| 30 | 20% | 80% | 0.1% | KBM 603 0.15% | 590 | 712 | >1,000 | ◎ | silane coupling component:

KBM 403   γ-glycidyloxypropyl-trimethoxysilane, 0.05% weight based on weight of glass fiber

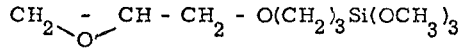

KBM 503   γ-methacryloxypropyl-trimethoxysilane      

KBM 603   N-β-(aminoethyl)-γ-aminopropyl-trimethoxysilane $NH_2CH_2CH_2N(CH_2)_3Si(OCH_3)_3$

TABLE VI

Mechanical Properties in Various Amounts of Glass Fiber Blended to Polypropylene Base Treated With Peroxide

| No. | Epoxysilane treated glass fiber | Polypropylene (approximate %) | Peroxide | Silane coupling agent | Tensile strength | Flexural strength | Oven-life | Color tone |
|---|---|---|---|---|---|---|---|---|
| 31 | 10% | 90% | BPO 0.1% | KBM 503 0.15% | 560 | 712 | 1,000 | ◎ |
| 29 | 20% | 80% | 0.1% | KBM 503 0.15% | 700 | 892 | 1,000 | ◎ |
| 32 | 30% | 70% | 0.1% | KBM 503 0.15% | 721 | 910 | 1,000 | ◎ |

Epoxysilane: 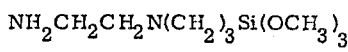, 0.05% weight based on weight of glass fiber

Where the glass fiber is treated with an epoxysilane, the oven-life of the composition was increased to more than 1,000 hours and the color tone was remarkably improved. Where benzoylperoxide and γ-methacryloxypropyltrimethoxysilane were added to polypropylene, the tensile strength and flexural strength of the composition was the highest.

(EXPERIMENT III)

Water-methanol (1:1) solutions of the peroxide, and the silane coupling component shown in Table VII, together with a stabilizer was added to polypropylene (melt index 10) and was blended by using a super mixer.

The specific amount of chopped strands of glass fibers having an average length of 7 mm. were treated with an epoxysilane and were added to said blended composition and mixed in a tumbler. Each sample was prepared by injection molding from powder in the condition of 240°C. temperature, and 60 rpm. screw rotary velocity.

The mechanical properties of each sample were measured. The results are shown in Table VII.

TABLE VII

Mechanical Properties in Various Concentrations of Peroxides by Extruding From Powder

| No. | Epoxysilane treated glass fiber | Polypropylene (approximate %) | Peroxide | Silane coupling agent | Tensile strength | Flexural strength | Oven-life | Color tone |
|---|---|---|---|---|---|---|---|---|
| 1 | - | - | - | - | 340 | 370 | } 1,000< | ◎ |
| 35 | 10% | 90% | - | - | 450 | 607 | | ◎ |
| 36 | 20% | 80% | - | - | 512 | 682 | | ◎ |
| 37 | 30% | 70% | - | - | 511 | 710 | | ◎ |
| 38 | 10% | 90% | BPO 0.1% | KBM 503 0.15% | 510 | 690 | } 1,000< | ◎ |
| 39 | 20% | 80% | 0.1% | 0.15% | 625 | 792 | | ◎ |
| 40 | 30% | 70% | 0.1% | 0.15% | 652 | 813 | | ◎ |

Epoxysilane: $CH_2\text{-}O\text{-}CH\text{-}CH_2\text{-}O(CH_2)_3Si(OCH_3)_3$ , 0.05% weight to glass fiber

COMPARATIVE EXPERIMENTS

It is known in the prior art to prepare compositions of the general type of this invention except to use all of the organosilane on the glass fibers, or to use all of the organosilane in the mixture with the polypropylene. It is not known, however, to apply some of the organosilane onto the fibers and some of the organosilane in the polypropylene mixture. This results in a superior product, however, as compared with the products of the prior art. To demonstrate the superiority of the process and resulting products of this invention, the following experiments have been conducted with the following results:

Water-methanol (1.1) solution of the silane coupling agent together with the peroxide shown in the table was added to polypropylene (melt index 10). The mixture was blended by using a super mixer.

The specific amount of chopped strand of glass fiber of 6 mm. of average length was treated with a silane coupling agent, and was added to said blended composition and mixed in a tumbler. The mixture was pelletized at a pelletizing temperature of 220°C at 70 rpm of screw rotary velocity by 40 mm diameter vented extruder. The resulting pellets were injection molded at a temperature of 240°C and a screw rotary velocity of 60 rpm, so as to prepare each sample. The mechanical properties of each sample were measured in accordance with ASTM D638, D790. The results are shown in Table VIII.

TABLE VIII

| Test No. | Glass fiber to total composition | Glass Fiber - Silane coupling agent Type | Content to glass fiber (%) | (Content to total composition) | Peroxide content (%) | Silane coupling agent added to polypropylene Type | content to total composition (%) | Tensile strength ASTM-D-638 (kg/cm²) | Flexural strength ASTM-D-790 (kg/cm²) | Oven-life (hr.) | Color tone |
|---|---|---|---|---|---|---|---|---|---|---|---|
| 1 | 20 | epoxy silane | 0.01 | (0.002) | 0.1 | KMB-503 | 0.198 | 550 | 745 | | white |
| 2 | 20 | " | 0.02 | (0.004) | 0.1 | " | 0.196 | 650 | 845 | | white |
| 3 | 20 | " | 0.03 | (0.006) | 0.1 | " | 0.194 | 697 | 880 | | white |
| 4 | 20 | " | 0.05 | (0.01) | 0.1 | " | 0.19 | 700 | 892 | more than 1000 | white |
| 5 | 20 | " | 0.05 | (0.01) | 0.1 | " | 0 | 610 | 730 | | yellow brown |
| 6 | 20 | " | 0 | 0 | 0.1 | " | 0.19 | 490 | 685 | | " |
| 7 | 20 | " | 0.07 | (0.014) | 0.1 | " | 0.186 | 710 | 900 | | white |
| 8 | 20 | " | 0.09 | (0.018) | 0.1 | " | 0.182 | 700 | 885 | | white |
| 9 | 20 | " | 1.0 | (0.20) | 0.1 | " | 0 | 586 | 790 | | yellow brown |
| 10 | 20 | " | 0 | 0. | 0.1 | " | 0.20 | 500 | 690 | | " | epoxy silane: $CH_2-CH-CH_2-O-(CH_2)_3Si(OCH_3)_3$ with epoxide on CH$_2$-CH

KBM-503: $CH_2=C-C-O(CH_2)_3Si(OCH_3)_3$ with $CH_3$ and $=O$

Peroxide: Benzoylperoxide 

Having now fully described the invention, it will be apparent that many changes and modifications can be made thereto without departing from the spirit or scope of the invention. For instance, in special instances, other thermoplastic resins can be substituted for polypropylene, such as polyethylene.

What is claimed as new and intended to be covered by Letters Patent is:

1. A process for preparing a glass fiber reinforced thermoplastic composition which comprises treating 5 – 60 percent by weight of glass fibers with 0.01 – 1.0 percent by weight based on the weight of said fibers, of an organosilane selected from the group consisting of bis-(β-hydroxyethyl)-γ-aminopropyltriethoxysilane, β-(3,4-epoxycyclohexyl)-ethyltrimethoxysilane, γ-glycidyloxypropyltrimethoxysilane, γ-aminopropyltriethoxysilane, N-β-(aminoethyl)-γ-aminopropyltriethoxysilane, and n-(dimethoxymethyl silylpropyl) ethylene diamine, admixing said treated fibers with 95 to 40 weight percent of polypropylene, and 0.01–0.5 percent by weight of a peroxide, and 0.1 to 5.0 percent by weight of an organosilane coupling agent selected from the group consisting of vinyltriethoxysilane, vinyltrichlorosilane, vinyl-tris (β-methoxyethoxy)-silane, γ-methacryloxypropyltrimethoxysilane, β-(3,4-epoxycyclohexyl)-ethyltrimethoxysilane, γ-glycidyloxypropyl-trimethoxysilane, γ-aminopropyltriethoxysilane, N-β-(aminoethyl)-γ-aminopropyltrimethoxysilane, bis (γ-hydroxyethyl γ-aminopropyltriethoxysilane, γ-chloropropylmethoxysilane, γ-mercaptopropyltrimethoxysilane, n-(dimethoxymethyl silylpropyl) ethylene diamine, γ-chloroisobutyltriethoxysilane, β-cyclohexylethyltrimethoxysilane, phenyltriethoxysilane, amyltrimethoxysilane, vinyltrimethoxysilane, and mixtures thereof, and melt-shaping the resulting mixture.

2. The process of claim 1, wherein said peroxide is benzoylperoxide, said organosilane admixed with the polypropylene resin is γ-methacryloxypropyltrimethoxysilane.

3. The process of claim 1, wherein said organosilane admixed with the polypropylene resin is γ-methacryloxypropyltrimethoxysilane.

4. The process of claim 1, wherein the peroxide is present in an amount of about 0.1 percent by weight.

5. The process of claim 1, wherein the peroxide is selected from the group consisting of benzoylperoxide, di-cumylperoxide and γ,γ'-bis(t-butylperoxy)p-diisopropylbenzene.

6. The process of claim 1, wherein the glass fiber is treated with γ-glycidyloxypropyl-trimethoxysilane and the organosilane coupling agent is selected from the group consisting of γ-methacryloxypropyl-trimethoxysilane and N-β-(aminoethyl)-γ-aminopropyl-trimethoxysilane.

7. The process of claim 1, wherein the glass fibers are chopped stranded having a diameter of 5–13 microns and up to 10 millimeters in length or a ribbon having a diameter of 5 to 13 microns.

8. The process of claim 1, wherein the polypropylene is a polypropylene powder having a melt index of 4–25.

9. The process of claim 1, wherein the glass fiber is present in the amount of from 5 to 40 percent by weight based on the weight of the total composition.

* * * * *